June 9, 1925.  1,541,477
T. F. CARPENTER
DEMOUNTABLE RIM
Filed April 17, 1922
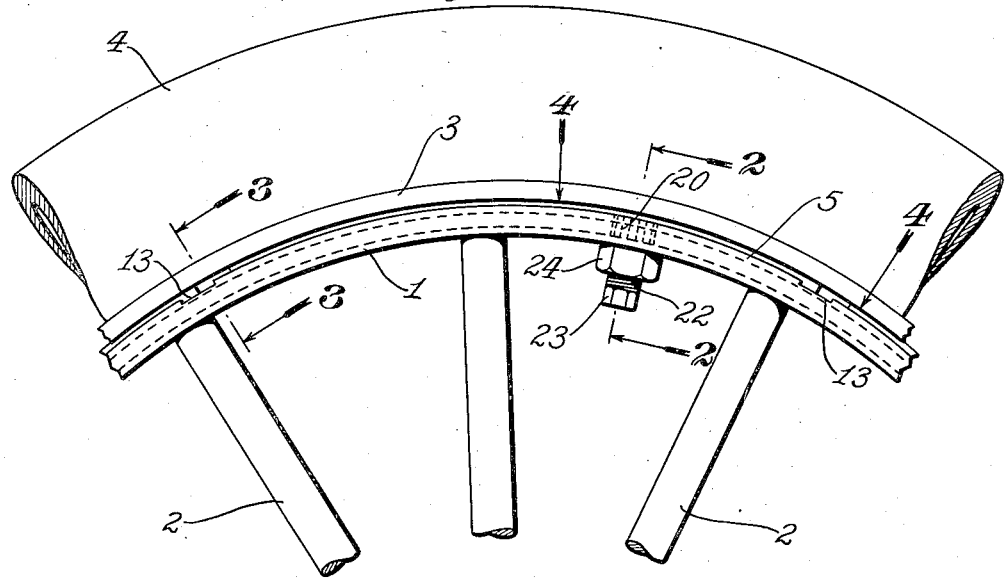
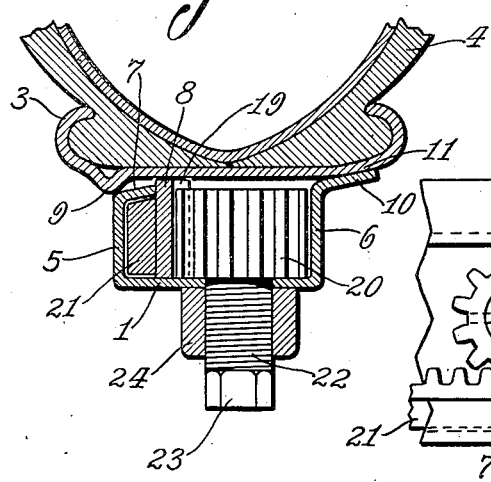
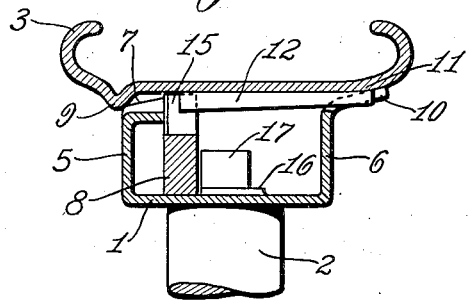
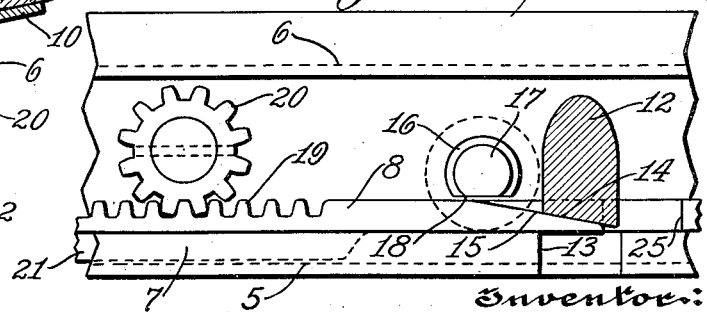
Inventor:
THOMAS F. CARPENTER,
John H. Bruninga,
His Attorney.

Patented June 9, 1925.

1,541,477

UNITED STATES PATENT OFFICE.

THOMAS F. CARPENTER, OF ST. LOUIS, MISSOURI, ASSIGNOR OF ONE-FOURTH TO CHARLES H. SCHOKMILLER, OF ST. LOUIS, MISSOURI.

DEMOUNTABLE RIM.

Application filed April 17, 1922. Serial No. 553,842.

*To all whom it may concern:*

Be it known that I, THOMAS F. CARPENTER, a citizen of the United States, and residing at St. Louis, Missouri, have invented the new and useful Improvement in Demountable Rims, of which the following is a specification.

This invention relates to demountable rims such as are used on the wheels of automobiles for the purpose of exchanging tires and the like.

One of the objects of this invention is to provide a demountable rim, which may be easily and quickly connected or disconnected from the wheel felloe and by a simple operation.

Another object of this invention is to provide a demountable rim which, when in place on the felloe, shall be rigidly supported.

Another object of this invention is to provide a demountable rim, which may be securely clamped to the wheel felloe at a plurality of points.

Another object of this invention is to provide a demountable rim, which shall be cheap and simple to construct, and durable in service.

Further objects will appear from the detail description taken in connection with the accompanying drawing, in which:

Figure 1 is a view in elevation, showing part of an automobile wheel having a demountable rim embodying this invention thereon;

Figure 2 is a section on line 2—2, Figure 1;

Figure 3 is a section on line 3—3, Figure 1; and

Figure 4 is a section on line 4—4, Figure 1.

Referring to the accompanying drawing, the wheel comprises a felloe 1 mounted on spokes 2 radiating from a suitable hub, not shown, and a demountable rim 3 adapted to carry the tire 4.

In the present invention, the felloe may be formed of sheet metal or other suitable material and is provided with upstanding side flanges 5 and 6. The flange 5 is provided with an in-turned edge 7 adapted to provide a bearing surface for the clamping ring 8. The flange 5 with its in-turned edge 7 thus forms a bearing flange adapted to receive the pressure of the clamping ring 8. The upper surface of the in-turned edge 7 is also adapted to receive and support an inwardly extending flange 9 on the rim 3. The edge 7 is inclined slightly in an outward direction so as to provide an inclined surface against which the flange 9 may be forced during the clamping operation, so as to have a solid and rigid bearing thereagainst.

The flange 6 is formed with an out-turned lip 10 against which the inclined edge 11 of the rim 3 may be forced by the clamping action, as will be hereinafter described. The lip 10 is thus adapted to form a stop-flange against which the edge 11 bears.

The rim 3 is provided at suitable intervals along its inner circumference with clamping lugs 12 welded or othewise securely fixed thereto. The lip 10 and the flange 6 may be provided with suitable notches 13 through which these lugs 12 may pass when the rim is applied to the felloe. One or more of the lugs 12 may be elongated as illustrated in Figure 3, so as to protrude through a notch 13, in the lip 10. These lugs will thus be locked in engagement with the felloe 1 so as to prevent circumferential slipping of the rim on the felloe. Each of the lugs 12 is provided with an inclined wedge or cam surface 14 adapted to provide an abutment to engage a corresponding wedge or cam surface 15 on the clamping ring 8.

The clamping ring 8 is adapted to encircle the felloe 1 and to lie within the flanges 5 and 6 bearing against the in-turned edge 7. The felloe 1 may be provided with a series of inwardly projecting lugs 16 formed by the in-turned edges of the perforations receiving the tips 17 of the spokes 2. These lugs 16 may be cut off in a direction parallel to the flange 5 as indicated at 18, so as to form stops adapted to maintain the clamping ring 8 in its position adjacent the edge 7. The wedge or cam surface 15 is cut into the ring 8 at intervals corresponding to those of the clamping lugs 12. The ring 8 is further provided with a rack 19 adapted to engage a pinion 20 mounted for rotation in the felloe 1. That portion of the ring 8 in which the rack 19 is cut, may be reenforced by a strip 21 brazed or otherwise suitably attached thereto. The strip 21 may be arranged to lie within the enclosure formed by the ring 8, the flange, 5 and the edge 7.

The pinion 20 has fixed thereto a threaded stem 22 extending radially inward through the felloe 1 and being provided with an angular portion 23 to which a wrench may be applied for turning the same. A jam nut 24 may be threaded onto the stem 22 so as to lock the same against movement.

In the use of this device, when it is desired to mount a rim on the wheel, the stem 22 may be rotated by means of a wrench applied to the angular portion 23 so as to rotate the pinion 20. The pinion 20 by virtue of its engagement with the rack 19 will slide the ring 8 around the felloe so as to retract the cam portions 15 from before the notches 13. The rim 3 may then be applied to the wheel from one side thereof and in such a way that the clamping lugs 12 will slip through the notches 13. The rim is applied from the side of the flange 5 and moved onto the felloe in a direction toward the flange 6. The lugs 12 pass through the notches 13 in the flange 6 and also through notches 25 in the ring 8 and adjacent the wedge 15, passing slightly beyond the edge 7 to a position to be engaged by the wedge 15. When the rim has been thus fitted on the felloe, the pinion 20 may be rotated so as to slide the ring 8 towards the right, Figure 2, so as to engage the wedges 14 and 15. As this movement of the ring 8 is continued, the rim 3 will be forced tightly onto the felloe until the edge 11 is securely locked against the stop-flange 10. At the same time, the flange 9 is moved onto the edge 7 to a secure bearing thereon. In this position the rim is rigidly attached to the felloe. It is secured against lateral displacement by engagement of the wedges 14 and 15 and against circumferential displacement by the engagement of certain of the lugs 12 with the notches 13' in the flange 6. When the rim has thus been rendered secure, the jam nut 24 may be turned up tight so as to prevent loosening of the same.

It is obvious that various changes may be made in details of construction within the scope of the appended claims without departing from the spirit of this invention; it is, therefore, to be understood that this invention is not to be limited to the specific details shown and described.

Having thus described the invention, what is claimed is:

1. A wheel comprising, a felloe provided with a bearing flange, a rim adapted to take over said felloe and having a rib adapted to engage said flange, abutments on said rim, a clamping ring mounted on said felloe inside of and bearing against said flange, and cams on said ring cooperating with said abutments.

2. A wheel comprising, a sheet metal felloe formed to provide a bearing flange having an inwardly directed edge, a rim adapted to take over said felloe, abutments on said rim, a clamping ring mounted on said felloe inside of said flange and bearing against said edge, and cams on said ring cooperating with said abutments.

3. A wheel comprising, a felloe provided with a stop flange and a bearing flange, a rim adapted to take over said felloe and against said stop flange and having a rib adapted to engage said bearing flange, a clamping ring mounted on said felloe inside of and bearing aginst said bearing flange, abutments on said rim, and cams on said ring cooperating with said abutments.

In testimony whereof I affix my signature this 24th day of March, 1922.

THOMAS F. CARPENTER.